UNITED STATES PATENT OFFICE.

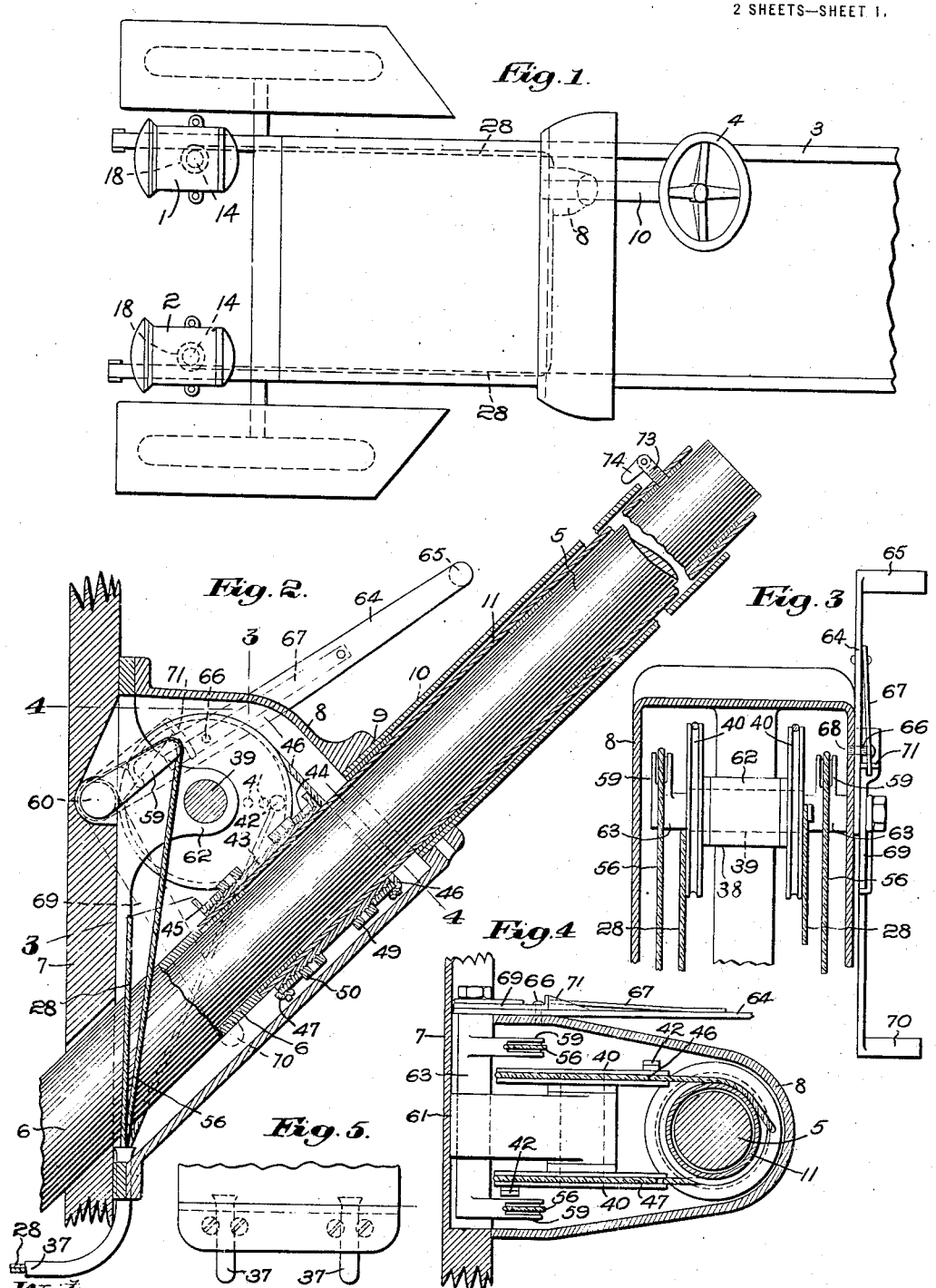

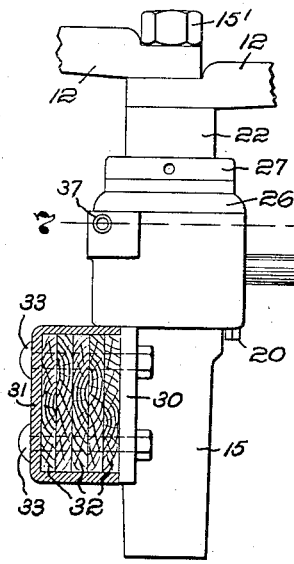
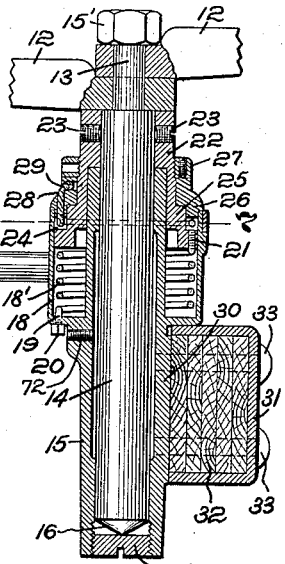
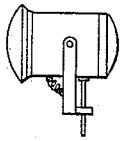
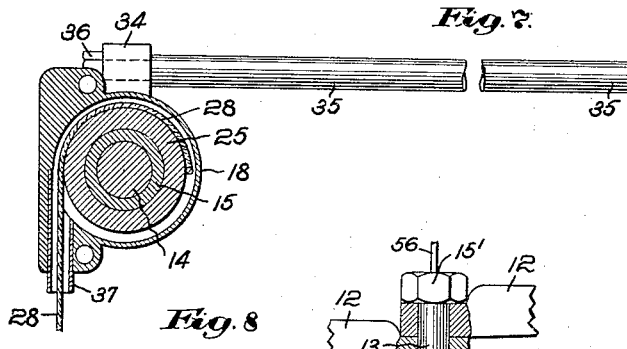
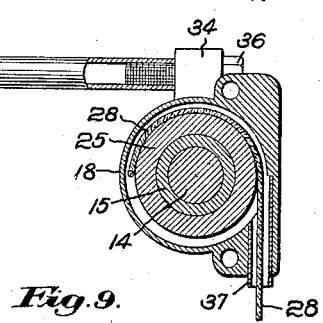
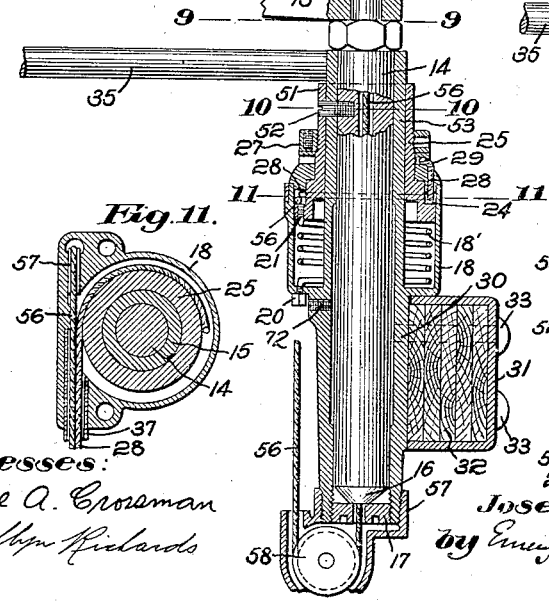
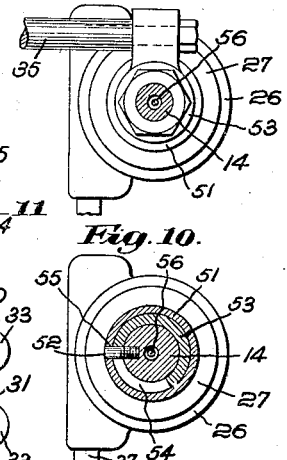

JOSEPH P. FOX, OF PROVIDENCE, RHODE ISLAND.

DIRIGIBLE HEADLIGHT.

1,240,695.     Specification of Letters Patent.     Patented Sept. 18, 1917.

Application filed October 25, 1913. Serial No. 797,303.

*To all whom it may concern:*

Be it known that I, JOSEPH P. FOX, a citizen of the United States, and a resident of Providence, county of Providence, and State of Rhode Island, (whose post-office address is No. 28 Bradford St., Providence, R. I.,) have invented an Improvement in Dirigible Headlights, of which the following description, in connection with the acompanying drawings, is a specification, like characters on the drawings representing like parts.

This invention relates to dirigible lights for power driven vehicles and to means for imparting movement thereto.

In order that the principle of the invention may be readily understood, I have disclosed a single embodiment thereof in the accompanying drawings, wherein:—

Figure 1 is a plan view of a portion of a power driven vehicle having my invention applied thereto;

Fig. 2 is a view, partially in vertical section through the steering gear, and partially in side elevation, of a portion of the means for imparting movement to a light or lights of the vehicle;

Fig. 3 is a transverse section upon the line 3—3 of Fig. 2;

Fig. 4 is a transverse section on the line 4—4 of Fig. 2;

Fig. 5 is a detail of one of the guiding tubes of the motion-transmitting flexible element;

Fig. 6 represents the brackets for two of the lights, one being shown in elevation and the other being in vertical section;

Fig. 7 is a transverse section upon the line 7—7 of Fig. 6;

Fig. 8 is a view similar to the right hand portion of Fig. 6 of a modified form of the invention; and Figs. 9, 10 and 11 are transverse sections upon the lines 9—9, 10—10 and 11—11 respectively of Fig. 8.

Fig. 12 is a detail showing the manner of mounting a lamp for movement about a transverse axis.

Referring more particularly to the drawings and first to that form of the invention shown in Figs. 1 to 7 inclusive, two of the lamps or lights to which movement may be imparted in accordance with my invention are represented at 1, 2 in Fig. 1, said lights being supported in any suitable or desired position at the front of the vehicle. The body of the vehicle is represented at 3 and the steering wheel or element is represented at 4 as conveniently positioned within reach of the driver's seat. Said steering wheel is connected in any suitable manner to the steering gear or steering means 5 connected in the usual manner to the transmission mechanism. Surrounding the lower portion of the steering gear 5 is preferably provided a tubular or sleeve-like casing 6, preferably passing through the dash board 7, and attached to the rear of the dash board and inclosing the lower portion of the steering gear 5 and its said casing 6 is a casing 8 having an opening 9 therein to receive the fixed tubular casing 10 which is preferably provided to surround the steering gear 5 and its driving tube 11. These parts may be of any suitable construction.

As shown most clearly in Figs. 6 and 7, the brackets for the two lights or lamps 1 and 2 are represented in part at 12—12. Each bracket is mounted upon the upper reduced end 13 of a shaft or spindle-like member 14 mounted in a suitable upright bracket 15 constituting a vertical bearing for said shaft and is held in such position by nut 15'. Preferably the lower end of said shaft or spindle-like member is tapered as indicated at 16 and is represented as resting upon a steel or other suitable plug 17 threaded into the lower end of said bracket. The said shaft 16 is represented as contacting peripherally with the inner wall of said bracket throughout a substantial portion of the length of the latter which thus constitutes a bearing therefor, so that the shaft is held in upright or substantially upright position for turning movement. Formed with or attached to the bracket 15 is a casing 18 surrounding the shaft bearing portion of said bracket and having positioned therein a coil spring 18'. One end of the spring is attached to a ring 26 to be referred to by threading a spur 21 of said spring into said ring. After this connection has been made the spring and ring are inserted over the lamp-post 14 and a spur 19 of the spring is inserted through a bore of the casing 18. A nut is threaded on this spur as is well shown in Figs. 6 and 8. By turning the nut 20 in a direction to tighten it, the spring 18' is expanded and pulls the shaft 14 down against its pivot plug 17, thus preventing the lamp from pulling the said shaft away from its bearing when the vehicle is traveling over rough roads. The upper bent end 21 of said spring is threaded into a sleeve 22 which at its upper end fits closely about the shaft 14 and is secured thereto by set screws 23. The said sleeve 22 is of any suitable shape, but preferably is internally shouldered adjacent its upper end to rest upon the upper end of the bracket 15. I have represented the lower end of said sleeve as externally shouldered so as to provide an annular space 24 between it and the casing 18, and above said annual space 24 I have represented the said sleeve as externally shouldered at 25 to receive an internally shouldered ring 26 loosely mounted upon said sleeve and held in position thereon by a lock nut 27. Preferably to some suitable portion of the ring 26, I attach a flexible element 28 which may be a wire, cable, band or the like. I have herein represented the end of said flexible element 28 as knotted at 29 and inserted and secured in a recessed portion of said ring. The said flexible element 28 extends through a suitable aperture in said ring 26 and into the annular space 24, and after passing partially about the ring 27 emerges therefrom, and extends as hereinafter set forth to the steering gear of the vehicle.

The ring 26 is tightened against the shoulder 25 of the sleeve 22 with each movement of the ring in the direction of pull upon the flexible element. The said flexible element is tightened by loosening the lock nut 27 and turning the loose ring 26 in the proper direction. Each spring 18' is so coiled and positioned that it tends to turn its lamp in a direction opposite to the direction of pull of the corresponding flexible element.

The bracket 15 may be connected in any suitable manner to the frame of the vehicle. I have herein represented the said bracket as having a boss 30 adjacent the frame 31 of the vehicle. Between said boss and the frame are positioned wooden or other filling blocks 32 and the bracket is held in suitable position by bolts 33 passing through said bracket and the filling blocks and into said boss 30.

The brackets 15 for said lights or lamps are provided with ears 34 which are connected by a brace rod 35 in any suitable manner as by means of bolts 36.

Each lamp or light, if a plurality thereof be employed, is provided with its individual flexible element for imparting movement thereto about the axis of the shaft 14. In Fig. 2, I have represented said flexible element 28 as extending from the lamp bracket through a suitable curved tube 37 which may be of any suitable length and is preferably made of soft metal so as to be bent into the desired shape. Each of the tubes 37 should, for the best results, be of suitable length to incase the flexible element throughout substantially the desired extent thereof between the lamp bracket and the dash board 7, though obviously such construction may be widely varied within the scope of my invention. The tubes 37 may be secured in position in any suitable manner.

While I may provide any suitable means for imparting longitudinal pull to each flexible element 28, I have herein represented a spool 38 loosely mounted upon a stud shaft 39 mounted in the casing 8 and having two disks or heads 40, 40 respectively receiving the flexible elements 28, 28 extending from the two lamps or lights 1, 2. As most clearly shown in Fig. 2, I provide the outer face of each disk 40 with a series of sockets 41 positioned at different distances from the center of rotation of said disks and within any one of which a pin 42 may be positioned and to which pin the end of the flexible element 28 may be connected. In this manner, the end of the flexible element 28 may be connected to its disk 40 at any desired distance from the center of rotation of the spool 38.

The disks 40 of the spool 38 are shown as spaced from each other a distance substantially corresponding to the diameter of the driving tube 11. Fast upon the said driving tube 11 is a sleeve 43 having right and left threads at both ends thereof. This sleeve is preferably of a length corresponding to the diameter of the disks 40 of the spool 38. Preferably the upper and lower ends of the sleeve 43 are provided with right hand threads and receive internally threaded flanged rings 44, 45, to each of which is attached one end of a secondary flexible element 46, 47, the other end whereof extends partially about the corresponding disk 40 preferably in a peripheral groove thereof, and is suitably attached at its end to said disk at any suitable point. The construction illustrated is such that the flexible elements extend directly from the disks to the said rings 44, 45. I preferably provide lock nuts 49, 50, adjacent to and bearing against the internally threaded rings 44, 45, said lock nuts engaging the left hand threaded portions of the sleeve 43, so as to lock said rings 44, 45, against movement relative to the sleeve 43. The flexible elements 46, 46 are wound in opposite directions about the rings 44, 45, and the driving tube 11 and the disks 40 so that by turning the driving tube 11 in either direction, one of the flexible elements is wound upon its disk 40 and the other is unwound from or slackened upon its disk. Each pull upon one or the other flexible elements tightens the corresponding lock nut 49, 50. Thus the spool 38 is turned in a direction corresponding to the direction of rotation of the driving tube, the nuts 49, 50 having been adjusted to slacken the flexible elements to correspond to the lost motion of the steering gear. In the construction and operation of the present power driven vehicle, there is more or less lost motion between the driving tube and the transmission mechanism controlled thereby. I avoid all lost motion between the steering gear and the lamp or lamps, so that the lamps or lights respond instantly in movement to each turn of the driving tube or the steering gear, after said lost motion ceases. Not only are the lamps free from lost motion relative to said driving gear, but they are centered by the springs 18' which immediately return the lamps to central position, when the strain upon the flexible element that has turned the lamp, has been released. The tension of each spring may be such as to return the lamp to center position.

Preferably the diameter of the disks 40 is such as to cause from one quarter to one half rotation of the said disks to a full movement of the steering wheel either to the right or to the left from the center or straight ahead position of the front vehicle wheels. This extreme movement is called for only when cranking the car in turning around. The described difference in diameter between the driving tube and the disks 40 represents the movement around a sharp corner, which is about one quarter turn of the disks 40. Each pin 42 is so positioned upon its disk 40 as to be between the upper and lower dead centers of the said disks when the vehicle wheels are straight, and preferably substantially as indicated in Fig. 2. Therefore, upon turning movement of the disks, as for example in a clockwise direction viewing Fig. 2, rapid initial movement is imparted to the flexible elements 28 with the desired rapid deflection of the lamps before the vehicle enters upon its new path. Continued turning movement of the disks 40 causes the pins 42 to approach nearer the upper dead center and hence to cause progressively slower movements of the flexible elements 28 until the said pins 42 cross the upper dead center and the turning movement of the lamps ceases. Upon crossing the said dead center a slight return movement of the lamps may result.

The desired angle to which each lamp can be turned is determined by the distance from the center of the respective pin 42, and owing to the adjustability of said pin the turning angle of the lamps may be controlled.

In Figs. 8 to 11, I have shown a slightly modified form of my invention. In the construction shown in these figures, the right hand lamp is adapted to be turned toward the right and the left hand lamp toward the left by the flexible elements 28, but a reversal of movement may be effected by adjustment of the parts. Therein I provide a sleeve 51 generally corresponding to the sleeve 22 shown in Fig. 6. Said sleeve is made fast to the shaft 14 by a set screw 52 which extends through the upper end of the bracket 53. The latter is provided with a slot 54 shown in Fig. 10 and extending circumferentially of the shaft to any desired extent. Upon rotation of the shaft 14 and its sleeve 51 by the corresponding flexible element, the screw 52 is turned in a contra-clockwise direction viewing Fig. 10, and upon release of said flexible element, the spring 18' turns the lamp in the opposite direction, and the screw 52 then takes against the end 55 of the slot 54 which is so positioned as to constitute a center stop for the lamp.

Viewing Figs. 9 and 11, it will be observed that the casing 18 of each lamp bracket is provided with an enlargement or extension 56 suitably channeled or recessed for the reception of the flexible element 28, a suitable pulley 57 being provided if desired.

If desired, I may provide means for tilting the lamp as well as rotating the same about an upright or substantially upright axis. While I may provide suitable mechanism for tilting the lamp support shown in Fig. 6 or that shown in Fig. 8, I have here chosen to represent suitable means for tilting the lamp support shown in Fig. 8. Within the scope of my invention, either the lateral turning or the tilting movement of the light or lights may be employed.

For the purpose of tilting that form of lamp support shown in Fig. 8, I provide an axial recess or passage through the shaft 15 and nut 17 and pass therethrough a flexible element 56 of any suitable character and which extends to the lamp, not shown in said figure, but illustrated in Fig. 12. Said lamp is preferably provided at its front end with a coiled spring tending when active to tilt the lamp downwardly. The flexible element is connected to the lamp at the opposite side of its transverse axis, so as to tilt the lamp upwardly in opposition to the said spring. Or I may reversely connect said spring and said flexible element to the lamp. Upon the lower end of the shaft 14, I preferably mount a suitable nut 57 and support therein a suitable pulley 58, about which the lamp-tilting, flexible element 56 passes. The said flexible element 56 enters the tube 37 as indicated in Fig. 11, the said tube being represented as of sufficient diameter to receive both flexible elements 57 and 28. If desired, however, separate tubes may be provided for said flexible elements. The said flexible element 56 after emerging from the inner end of the tube 37, as indicated in Fig. 2, passes upwardly to and is suitably connected to a crank arm 59 of a rock shaft pivoted at 60 in preferably a recessed portion of the dash board 7. As indicated in Figs. 3 and 4, I preferably form the crank 59 as a yoke-like member in order that it may receive the two tilting, flexible elements 56, 56 extending from the two lamps of the vehicle. The said yoke-like crank member 59 is preferably mounted in a bearing 61 formed in a bracket containing the bearing 62 for the spool 38.

Any suitable means may be provided to hold the lamp or lamps in a central position as regards the limits of tilting movement thereof. For this purpose, I have in Figs. 3 and 4 represented the rock shaft or connecting member 63 of the cranks 59, 59 as having fast thereon at one end and hence co-axial therewith a lever 64 provided with a foot piece 65 within convenient reach of a foot of the driver. Said lever is provided with a pin 66 which is normally inwardly pressed by a spring 67 and the adjacent portion of the casing 8 is provided with a hole 68 to receive the pin 66 when brought into alinement therewith. When the pin 66 is positioned in the hole 68, the lamps are held horizontally or at such other central position between the limits of its tilting movement as may be desired or determined upon. When it is desired to tilt the lamps either up or down, I release the pin 66 from the hole 68. This I may accomplish in any suitable manner. Herein for the purpose I provide a lever 69 mounted co-axially and loosely with respect to the cranks 59, 59, and preferably upon the connecting member 63. Upon the lower end of said lever, I provide a foot piece 70, also within convenient reach of the driver's seat, and upon the upper end thereof a wedge portion 71. Upon suitable movement of the lever 69 by the foot, the wedge portion 71 thereof withdraws the pin from the hole 68, and thereupon releases the holding means for the lamps so that upon the movement of the lever 64, the lamps are tilted upwardly or downwardly according to the direction of movement of said lever. Obviously the construction may be such that either a single lamp or a plurality of lamps may be tilted. The lever 69 may be returned to normal position by the spring 67.

In this manner and by a slight movement of the foot the headlight or headlights may be tilted so as to deflect the glare from an on-coming car, and as quickly the lamp or lamps may be returned by a slight foot movement.

From the foregoing description, it will be evident that I have provided means to turn a lamp or lamps upon a substantially upright axis and have provided means independent of such turning means for centering the lamp or lamps.

It will be observed that the means for centering each lamp is not only automatic, but is independent of the lost motion of the steering gear. The connections for compensating for or overcoming the lost motion of the steering gear are adjustable in any suitable manner, one embodiment of such means being herein disclosed.

It will be observed that by the employment of eccentric or crank means, such for example as the disks 40, I provide a relative difference in speed of the lamp movement with respect to that of the steering gear. Any suitable means to accomplish this purpose may be employed. Preferably, however, I employ means operating as a crank or as an eccentric.

I may, if desired, provide any suitable means to prevent one or more lamps from being turned by the normal operation of the flexible element or flexible elements 28. For that purpose, I have, in Figs. 6 and 8, represented a set screw 72 which may be turned to engage the lamp shaft or spindle-like member 14. Upon tightening said screw 72, the screws 23, shown in Fig. 6, or the screw 52, shown in Fig. 8, are loosened so as to permit rotation only of the collar 22 or the collar 51 by the flexible element. This longitudinal pull upon the flexible element pertaining to that lamp whereof the screws have been adjusted as described will result merely in turning the collar while leaving the lamp itself stationary. I may thus render either one or a plurality of lamps inactive so far as lateral turning is concerned.

It will be observed that in the described embodiment of the invention, I have illustrated supporting means between the steering column and the dash board to carry or support the intermediate motion transmission means, said support constituting a support for the steering column.

It will furthermore be observed that the flexible elements for the two lamps herein illustrated are so arranged as to compensate for the stopping of one lamp while allowing the other a further movement.

In operating the light or lights, I may employ mechanism such as disclosed in my Patent No. 1,038,739, dated September 17, 1912, or any other suitable mechanism.

Any suitable means may be provided to connect the driving tube 11 to the steering gear 5. For this purpose, I have herein represented set screw 73 mounted in the driving tube 11 and adapted to bind when rotated against the steering gear so as to compel conjoint rotation thereof. If desired, the set screw may be provided with a pivoted handle or turning member 74.

Having thus described one illustrative embodiment of my invention, I desire it to be understood that although specific terms are employed, they are used in a generic and descriptive sense and not for purposes of limitation, the scope of the invention being set forth in the following claims.

Claims:

1. In combination in a vehicle, a steering gear, a rotatable driving member moving therewith, a dirigible light, a tensile connection between said member and light to cause the former to drive the latter and means whereby to adjust the point of attachment of said connection relative to the axis of rotation of said driving member.

2. A vehicle comprising in combination, a steering gear, shaft, a sleeve turned thereby, a dirigible light, and motion transmitting means between said sleeve and light including a pulley and a flexible element extending from opposite sides of said pulley to the opposite sides of said sleeve.

3. A vehicle comprising in combination, a steering gear, shaft, a sleeve turned thereby, a plurality of dirigible lights, and motion transmitting means between said sleeve and said lights comprising a pulley, and a flexible element connecting opposite sides of said pulley and opposite sides of said sleeve.

4. A vehicle comprising in combination, a steering gear, a dirigible light, and means to operate the latter by the former including motion transmitting means, pulleys, a sleeve having rings, connections from said rings to said pulleys, and threaded lock nuts for said rings.

5. A vehicle comprising in combination, a steering gear, a dirigible light, and means to operate the latter by the former including motion transmission means, a pulley, a sleeve having a ring, a connection from said ring to said pulley, and a threaded lock nut for said ring.

6. A vehicle comprising in combination, a steering gear, a dirigible lamp, a bracket therefor, a lamp shaft mounted in said bracket, and a spring connected to said bracket and shaft to rotate the latter and having provision to thrust said shaft axially and hold it in position.

7. A vehicle comprising in combination, a steering gear, a dirigible lamp, a casing therefor, a ring loosely mounted upon said casing, a motion transmission flexible element connecting said steering gear and ring, and a lock nut threaded upon said casing to lock said ring to the casing upon movement of said flexible element.

8. A vehicle comprising in combination, a steering gear, a dirigible light, a shouldered casing therefor, a ring loosely resting upon said shoulder, a flexible motion transmission element connected to said steering gear and said ring and tensioned by movement of said ring, and a lock nut threaded to said casing and engaging said ring and adapted to lock the ring against said shoulder in each direction of movement of said flexible element.

9. A vehicle comprising in combination, a steering gear, a dirigible lamp therefor having a shaft, an upright bearing for said shaft, a casing surrounding said shaft and a lamp operating spring supported by said casing, a motion transmission flexible element between said lamp shaft and said steering gear, a sleeve mounted upon said shaft and consituting a cover for said casing, and a cap to which one end of said flexible element is connected.

10. A vehicle comprising in combination, a steering gear, a laterally swiveling lamp, connecting means between said steering gear and lamp to impart said lateral swivel movement, and independent driving means within reach of the driver's seat for titling and centering the lamp and comprising a spring and foot lever, said driving means being independent of said connecting means.

11. A vehicle comprising in combination, a steering gear, a laterally swiveling lamp, connecting means between said gear and lamp for imparting said lateral swiveling movement, and independent means manually operable from the driver's seat for centering said lamp and for tilting the same to any desired angle.

12. A vehicle comprising in combination, a steering gear, a laterally swiveling lamp, connecting means between said gear and lamp for imparting said lateral swiveling movement, and independent means manually operable from the driver's seat for centering said lamp and for tilting the same to any desired angle, said means including a lever and a controlling spring therefor.

13. A vehicle comprising in combination, a steering gear, a light having spring means to tilt the same in one direction about a transverse axis, means accessible from the driver's seat for tilting the light in the opposite direction and for locking the light in center position, and a wedge to release said locking means.

14. A vehicle comprising in combination, a steering gear, a laterally swiveling light having spring means to tilt the same in one direction about a transverse axis, means accesible from the driver's seat for tilting the light in the opposite direction and for locking the light in center position, and a wedge to release said locking means.

15. In a vehicle the combination of a laterally swinging lamp, a steering gear, and means for transmitting movement from said gear to said light including a sleeve, a pulley, a flexible connection fastened to said sleeve and pulley, and means for adjusting the point of attachment of said connection with one of them for delaying the turning of said pulley until after a predetermined movement of said sleeve.

16. In a vehicle the combination of a casing, a lamp post having an end thrust bearing at the bottom of said casing, the latter being formed to present an annular chamber surrounding said post, a helical spring in said chamber, and a ring for closing the upper end of said chamber fast to said post and to said spring.

17. The combination of a casing, a lamp post therein having its lower end finding a bearing at the bottom of said casing, a stop pin projecting from said post into a slot in said casing, a sleeve on said casing connected to said pin, a spring tending to rotate said sleeve and post to press said pin against an end of said casing slot, a steering gear, and transmission means connecting said steering gear with said sleeve.

18. In combination in a vehicle, steering gear, a rotatably mounted lamp, a train of mechanism connecting said gear and lamp, to impart rotatory movement to said lamp on actuation of said steering gear, said train including eccentric means producing a maximum movement of said lamp in one sense of rotation prior to maximum unidirectional movement of the steering gear.

19. In combination in a vehicle, a steering gear, a rotatably mounted lamp and a train of mechanism connecting said gear and lamp to impart rotatory movement to said lamp on actuation of the steering gear, said train including eccentric means producing a maximum movement of said lamp in one sense of rotation prior to maximum unidirectonal movement of the steering gear and producing rotation in the opposite sense on continued movement.

In testimony whereof, I have signed my name to this specification, in the presence of two subscribing witnesses.

JOSEPH P. FOX.

Witnesses:
  MAY H. LOWRY,
  ROBERT H. KAMMLER.

Copies of this patent may be obtained for five cents each, by addressing the "Commissioner of Patents, Washington, D. C."